US012080456B2

(12) United States Patent
Sano

(10) Patent No.: US 12,080,456 B2
(45) Date of Patent: Sep. 3, 2024

(54) SOFT MAGNETIC POWDER, DUST CORE, MAGNETIC ELEMENT, ELECTRONIC DEVICE, AND VEHICLE

(71) Applicant: Seiko Epson Corporation, Tokyo (JP)

(72) Inventor: Toshiki Sano, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/741,526

(22) Filed: May 11, 2022

(65) Prior Publication Data

US 2022/0375665 A1 Nov. 24, 2022

(30) Foreign Application Priority Data

May 12, 2021 (JP) ................................. 2021-081264

(51) Int. Cl.
*H01F 1/153* (2006.01)

(52) U.S. Cl.
CPC ................................... *H01F 1/153* (2013.01)

(58) Field of Classification Search
None
See application file for complete search history.

(56) References Cited

U.S. PATENT DOCUMENTS 11,017,925 B2 5/2021 Kudo
2018/0301258 A1* 10/2018 Kudo ................. H01F 1/15375

FOREIGN PATENT DOCUMENTS

CN 108735416 A 11/2018
JP 2021-034460 A 3/2021

OTHER PUBLICATIONS

English translation of Oura et al. (TW 202029230). (Year: 2020).*

* cited by examiner

*Primary Examiner* — Ronak C Patel
(74) *Attorney, Agent, or Firm* — Harness, Dickey & Pierce, P.L.C.

(57) ABSTRACT

There is provided a soft magnetic powder containing soft magnetic metal particles satisfying the following formulas (A) (B), and (C), $$S=k\{6/(d\cdot\rho)\} \quad \text{(A)}$$

$$1.0\leq k\leq 4.0 \quad \text{(B)}$$

$$1.0\leq d\leq 10.0 \quad \text{(C)}$$

in which S [$m^2/g$] indicates a specific surface area, d [μm] indicates an average particle diameter, and ρ [$g/cm^3$] indicates a true specific gravity.

9 Claims, 7 Drawing Sheets

SOFT MAGNETIC POWDER, DUST CORE, MAGNETIC ELEMENT, ELECTRONIC DEVICE, AND VEHICLE

The present application is based on, and claims priority from JP Application Serial Number 2021-081264, filed May 12, 2021, the disclosure of which is hereby incorporated by reference herein in its entirety.

BACKGROUND

1. Technical Field

The present disclosure relates to a soft magnetic powder, a dust core, a magnetic element, an electronic device, and a vehicle.

2. Related Art

JP-A-2021-34460 discloses a silicon oxide-coated soft magnetic powder made of particles having a silicon oxide coating layer at a surface of soft magnetic metal particles having an iron content of 20 mass % or more. In the silicon oxide-coated soft magnetic powder, the silicon oxide coating layer has an average film thickness of 0.5 to 30 nm and a BET specific surface area of 1.0 $m^2/g$ or less.

In such a powder, by forming the silicon oxide coating layer at the surface of the soft magnetic metal particles, the formation of micropores is reduced, and the BET specific surface area is reduced. When the specific surface area is reduced, a usage amount of a resin can be reduced when the soft magnetic powder is pressure molded. Accordingly, it is possible to prevent a decrease in magnetic properties of the dust core.

In the silicon oxide-coated soft magnetic powder described in JP-A-2021-34460, the silicon oxide coating layer is formed in order to reduce the specific surface area. That is, in the invention described in JP-A-2021-34460, it is necessary to add a silicon oxide in order to achieve the purpose of reducing the usage amount of the resin necessary for pressure molding. Therefore, by the addition of the silicon oxide, a filling ratio of the soft magnetic metal particles is decreased, and the magnetic properties of the dust core are rather decreased.

SUMMARY

A soft magnetic powder according to an application example of the present disclosure contains soft magnetic metal particles satisfying the following formulas (A), (B), and (C), $$S=k\{6/(d\cdot\rho)\} \quad \text{(A)}$$

$$1.0\leq k\leq 4.0 \quad \text{(B)}$$

$$1.0\leq d\leq 10.0 \quad \text{(C)}$$

in which S [$m^2/g$] indicates a specific surface area, d [μm] indicates an average particle diameter, and ρ [$g/cm^3$] indicates a true specific gravity.

A dust core according to an application example of the present disclosure contains the soft magnetic powder according to the application example of the present disclosure.

A magnetic element according to an application example of the present disclosure includes the dust core according to the application example of the present disclosure.

An electronic device according to an application example of the present disclosure includes the magnetic element according to the application example of the present disclosure.

A vehicle according to an application example of the present disclosure includes the magnetic element according to the application example of the present disclosure.

DESCRIPTION OF EXEMPLARY EMBODIMENTS

Figure 1:
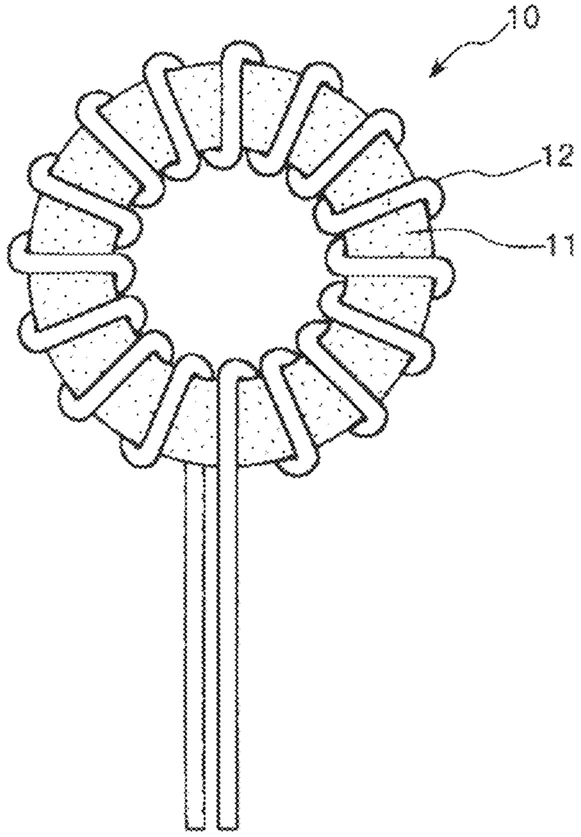
FIG. 1 is a plan view schematically showing a coil component of a toroidal type.

Hereinafter, a soft magnetic powder, a dust core, a magnetic element, an electronic device, and a vehicle according to the present disclosure will be described in detail based on preferred embodiments shown in the accompanying drawings.

1. Soft Magnetic Powder

The soft magnetic powder according to an embodiment is a metal powder that exhibits soft magnetism. The soft magnetic powder can be applied to any application, and for example, is used for manufacturing various compacts such as a dust core and an electromagnetic wave absorber in which particles are bound to each other via a binder.

The soft magnetic powder according to the embodiment contains soft magnetic metal particles. The soft magnetic metal particles satisfy the following formulas (A), (B), and (C), $$S=k\{6/(d\cdot\rho)\} \quad \text{(A)}$$

$$1.0\leq k\leq 4.0 \quad \text{(B)}$$

$$1.0\leq d\leq 10.0 \quad \text{(C)}$$

in which S [$m^2/g$] indicates a specific surface area, d [μm] indicates an average particle diameter, and ρ [$g/cm^3$] indicates a true specific gravity.

As described above, such a soft magnetic powder contains soft magnetic metal particles in which the increase in the specific surface area S is sufficiently reduced as compared with a theoretical specific surface area of spherical particles which is assumed from the average particle diameter d and the true specific gravity ρ. Therefore, when a compact in which particles are bound to each other via a binder is obtained, such a soft magnetic powder makes it possible to reduce a usage amount of the binder. Accordingly, the filling ratio of the soft magnetic metal particles in the compact is increased, and a compact having excellent magnetic properties such as magnetic permeability and magnetic flux density can be obtained.

In addition, since the soft magnetic powder has a sufficiently small average particle diameter d, an eddy current loss in the compact can be reduced. Therefore, according to such a soft magnetic powder, it is possible to realize a compact having excellent magnetic properties and a small core loss.

The specific surface area S of the soft magnetic metal particles is measured using, for example, a BET specific surface area measuring device HM1201-010 manufactured by Mountech Co., Ltd. An amount of a sample is 5 g.

When the theoretical specific surface area of the true spherical particles calculated based on the average particle diameter d and the true specific gravity ρ is used as a reference, it can be said that the soft magnetic metal particles having the specific surface area S satisfying the above formula (A) have a specific surface area S in which an increase based on the reference is sufficiently reduced.

The inventors have found that when the coefficient k included in the formula (A) satisfies the above formula (B), the soft magnetic metal particles exhibit good fluidity and filling property even when the usage amount of the binder is sufficiently reduced. Therefore, when the coefficient k included in the formula (A) satisfies the above formula (B), it is possible to obtain a compact having good filling property of the soft magnetic powder while reducing the usage amount of the binder. In such a compact, since the usage amount of the binder is small, excellent magnetic properties are obtained and strength is increased.

The coefficient k included in the formula (A) preferably satisfies the following formula (B-1), and more preferably satisfies the following formula (B-2).

$$1.0 \leq k \leq 3.5 \quad \text{(B-1)}$$

$$1.0 \leq k \leq 3.0 \quad \text{(B-2)}$$

When a value of the coefficient k exceeds the upper limit value, the specific surface area S is significantly increased as compared with the reference, and thus the usage amount of the binder is also significantly increased. As a result, the filling ratio (occupancy) of the soft magnetic metal particles in the compact may be decreased, and the magnetic properties of the compact may be decreased.

In addition, the average particle diameter d satisfies the above formula (C). When the average particle diameter d is sufficiently small as described above, the eddy current loss in the compact can be reduced as described above.

The average particle diameter d preferably satisfies the following formula (C-1), and more preferably satisfies the following formula (C-2).

$$1.5 \leq d \leq 9.5 \quad \text{(C-1)}$$

$$2.0 \leq d \leq 9.0 \quad \text{(C-2)}$$

When the average particle diameter d is less than the lower limit value, the aggregation becomes remarkable, and the fluidity and the filling property of the soft magnetic powder may be decreased. When the average particle diameter d exceeds the upper limit value, the eddy current loss in the compact may be increased. In addition, a gap between the particles becomes large, and the filling property of the soft magnetic powder may be decreased.

In a volume-based particle size distribution obtained by a laser diffraction method, the average particle diameter d of the soft magnetic metal particles is obtained as a particle diameter D50 at 50% accumulation from a small diameter side.

In addition, in the volume-based particle size distribution obtained by the laser diffraction method, the soft magnetic metal particles have a particle diameter D10 at 10% accumulation from the small diameter side, and have a particle diameter D90 at 90% accumulation from the small diameter side. At this time, (D90−D10)/D50 is preferably 1.0 or more and 1.5 or less, and more preferably 1.0 or more and 1.3 or less. (D90−D10)/D50 is an index indicating a degree of expansion of the particle size distribution, and when the index is within the above range, the filling property of the soft magnetic metal particles is good. Therefore, a compact having particularly high magnetic properties such as magnetic permeability and magnetic flux density can be obtained.

The soft magnetic powder may contain any soft magnetic particle or non-magnetic particle in addition to the soft magnetic metal particles satisfying the above conditions, and a content of the soft magnetic metal particles is preferably 50 mass % or more, more preferably 80 mass % or more, and still more preferably 90 mass % or more.

The soft magnetic metal particles are made of a soft magnetic material. The soft magnetic material is not particularly limited as long as it is a soft magnetic material containing Fe, Ni, or Co as a main component, and examples of the soft magnetic material include various Fe-based alloys such as an Fe—Si-based alloy such as pure iron and silicon steel, an Fe—Ni-based alloy such as permalloy, an Fe—Co-based alloy such as permendur, an Fe—Si—Al-based alloy such as sendust, an Fe—Cr—Si-based alloy, and an Fe—Cr—Al-based alloy, various Ni-based alloys, and various Co-based alloys. Among these, various Fe-based alloys are preferably used from the viewpoint of the magnetic properties such as the magnetic permeability and the magnetic flux density, cost, and the like.

In addition, a material having a composition containing Fe as a main component and containing Si or Cr as an element having a second highest concentration after the main component is particularly preferably used. In the particles made of such a material, an oxide film containing a Si oxide or a Cr oxide is formed at the surface of the particles. By the oxide film preventing the oxidation of a parent phase, it is possible to prevent an increase in the specific surface area and a change in a particle shape. The main component means that the concentration of Fe, Ni, or Co is the highest in terms of atomic ratio.

In addition, a crystal structure of the soft magnetic metal particles is not particularly limited, and may be crystalline, amorphous, or microcrystalline (nanocrystalline).

Among these, the soft magnetic metal particles preferably contain a microcrystalline material as a main material. The microcrystalline material is a material made of a crystal structure having a particle diameter of 1.0 nm or more and 30.0 nm or less. By containing such a microcrystalline material, the soft magnetism of the soft magnetic metal particles can be further improved. That is, soft magnetic metal particles having both low coercive force and high magnetic permeability can be obtained.

The main material means that a ratio of the microcrystalline material in the soft magnetic metal particles is 50 vol % or more, and is preferably 70 vol % or more. The soft magnetic metal particles may contain, in addition to the microcrystalline material, at least one of a crystalline material and an amorphous material. The crystalline material refers to a material made of a crystal structure having a particle diameter of 30.0 nm or more. In addition, the amorphous material refers to a material made of an amorphous structure.

In addition, the soft magnetic metal particles preferably contain an amorphous material as a main material. The amorphous material is a material made of an amorphous structure. By containing such an amorphous material, the soft magnetism of the soft magnetic metal particles can be further improved.

The main material means that a ratio of the amorphous material in the soft magnetic metal particles is 50 vol % or more, and is preferably 70 vol % or more. The soft magnetic metal particles may contain, in addition to the amorphous material, at least one of a crystalline material and a microcrystalline material.

In the soft magnetic powder, two or more of particles containing a microcrystalline material as a main material, particles containing an amorphous material as a main material, and particles containing a crystalline material as a main material may be mixed. Accordingly, it is possible to realize a soft magnetic powder having properties of a plurality of types of particles.

Examples of the amorphous material and the microcrystalline material include Fe-based alloys such as Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, Fe—Si—B—Nb—Cu-based, and Fe—Zr—B-based alloys, Ni-based alloys such as Ni—Si—B-based and Ni—P—B-based alloys, and Co-based alloys such as Co—Si—B-based alloys.

The soft magnetic powder may contain impurities in addition to the soft magnetic material. For example, an oxygen content of the soft magnetic metal particles is, in terms of mass ratio, preferably 10000 ppm or less, more preferably 1000 ppm or more and 8000 ppm or less, and still more preferably 2000 ppm or more and 6000 ppm or less.

When the oxygen content of the soft magnetic metal particles is within the above range, an amount of an oxide adhering to the surface of the soft magnetic metal particles can be sufficiently reduced. The oxide at the surface of the particles is one of causes of increasing the specific surface area S of the soft magnetic metal particles. Therefore, the specific surface area S can be further reduced by reducing the amount of the oxide.

The oxygen content of the soft magnetic metal particles is measured by, for example, an oxygen and nitrogen analyzer TC-300/EF-300 manufactured by LECO Corporation.

An insulating film may be provided at the surface of the soft magnetic metal particles as necessary. That is, the soft magnetic powder may contain the soft magnetic metal particles and the insulating film provided at the surface of the soft magnetic metal particles. By providing such an insulating film, the insulation between the soft magnetic metal particles can be improved. As a result, an eddy current flowing through the particles can be prevented, and the eddy current loss in the compact can be reduced.

Examples of the insulating film include a glass material, a ceramic material, and a resin material.

The coercive force of the soft magnetic metal particles is not particularly limited, and is preferably 20 [Oe] or less (1592 [A/m] or less), more preferably 10 [Oe] or less (796 [A/m] or less), and still more preferably 0.1 [Oe] or more and 3.0 [Oe] or less (8.0 [A/m] or more and 239 [A/m] or less). By using the soft magnetic metal particles having such a small coercive force, it is possible to manufacture a compact capable of sufficiently reducing hysteresis loss even when the soft magnetic metal particles are used in a high frequency region.

The coercive force of the soft magnetic metal particles can be measured, for example, by a vibrating sample magnetometer such as TM-VSM1230-MHHL manufactured by Tamakawa Co., Ltd.

The soft magnetic metal particles according to the embodiment, when being formed into a compact, have a magnetic permeability of preferably 15 or more, and more preferably 17 or more at a measurement frequency of 100 kHz. Such soft magnetic metal particles contribute to the realization of a dust core having excellent magnetic properties.

The magnetic permeability of the compact is, for example, a relative magnetic permeability obtained based on a self-inductance of a magnetic core coil of a closed magnetic circuit type in which the compact has a toroidal shape, that is, an effective magnetic permeability. For the measurement of the magnetic permeability, an impedance analyzer is used, and the measurement frequency is 100 kHz. In addition, the number of turns of the winding is 7, and a wire diameter of the winding is 0.6 mm.

2. Method for Manufacturing Soft Magnetic Powder

Next, an example of a method for manufacturing the above soft magnetic powder will be described.

The above soft magnetic metal particles may be a powder manufactured by any method. Examples of the method for manufacturing the soft magnetic powder include, in addition to various atomization methods such as a water atomization method, a gas atomization method, and a rotary water atomization method, a pulverization method. Among these, particles manufactured by an atomization method are preferably used as the soft magnetic metal particles. According to the atomization method, it is possible to efficiently manufacture a high-quality metal powder having a particle shape close to a true sphere and having less formation of an oxide or the like. Therefore, a metal powder having a small specific surface area can be manufactured by the atomization method.

The atomization method is a method for manufacturing a metal powder by causing a molten metal to collide with a liquid or a gas ejected at a high speed so as to pulverize and cool the molten metal. In the atomization method, since the spheroidizing is performed in the process of solidification after the molten metal is micronized, particles closer to a true sphere can be manufactured.

Among them, the water atomization method is a method for manufacturing a metal powder from a molten metal by using a liquid such as water as a cooling liquid, spraying the liquid in an inverted conical shape that converges the liquid to one point, and causing the molten metal to flow down toward the convergence point and to collide with the liquid.

In addition, the rotary water atomization method is a method for manufacturing a metal powder by supplying a cooling liquid along an inner peripheral surface of a cooling cylinder, swirling the cooling liquid along the inner peripheral surface, spraying a jet of a liquid or a gas to a molten metal, and merging the scattered molten metal into the cooling liquid.

Further, the gas atomization method is a method for manufacturing a metal powder from a molten metal by using a gas as a cooling medium, injecting the gas in an inverted conical shape that converges the gas to one point, and causing the molten metal to flow down toward the convergence point and collide with the gas.

A flow velocity of the liquid or gas is not particularly limited, and is preferably set to 100 m/s or more and 1000 m/s or less. Accordingly, since a sufficient speed is given to the scattered liquid droplets, the liquid droplets are easily cooled. As a result, generation of an oxide is prevented, and the specific surface area of the particles to be manufactured can be reduced. In addition, since the molten metal is solidified while the atomic arrangement in the state of the molten metal is preserved, for example, when the powder of the amorphous material is manufactured, the powder having a high degree of amorphization can be efficiently manufactured. The specific surface area of the soft magnetic powder tends to be reduced by increasing a flow velocity of the cooling medium.

A temperature of the molten metal is preferably set to, with respect to a melting point Tm of a raw material, about Tm+20° C. or more and Tm+200° C. or less, and more preferably set to about Tm+50° C. or more and Tm+150° C. or less. Accordingly, when the molten metal is pulverized, the particles to be manufactured are spheronized, and the specific surface area can be reduced. The specific surface area of the soft magnetic powder tends to be reduced by increasing the temperature of the molten metal.

A cooling rate at the time of cooling the molten metal in the atomization method is preferably $1\times10^{4\circ}$ C./s or more, and more preferably $1\times10^{5\circ}$ C./s or more. By such rapid cooling, the generation of an oxide is prevented, and the specific surface area of the particles to be manufactured can be reduced. In addition, since the molten metal is solidified while the atomic arrangement in the state of the molten metal is preserved, for example, when the powder of the amorphous material is manufactured, the powder having a high degree of amorphization can be efficiently manufactured.

By subjecting the soft magnetic metal particles manufactured by the above method to a heat treatment, the magnetic properties can be improved, and the coercive force can be further reduced. In addition, the specific surface area can be reduced.

A heating temperature in the heat treatment is preferably Tx−250° C. or more and less than Tx, and more preferably Tx−100° C. or more and less than Tx, in which Tx is the crystallization temperature of the soft magnetic metal particles.

When the heating temperature is within the above range, a heating time of the heat treatment is preferably 5 minutes or more and 120 minutes or less, and more preferably 10 minutes or more and 60 minutes or less.

By performing the heat treatment under such heating conditions, it is possible to relax a residual stress caused by rapid solidification generated during the manufacturing of the soft magnetic metal particles. Accordingly, a strain in the soft magnetic metal particles is relaxed, the coercive force can be reduced, and the magnetic properties can be improved. In addition, the surface of the particles becomes smooth, and the specific surface area is reduced.

In addition, the manufactured soft magnetic metal particles may be classified as necessary. Examples of a classification method include dry classification such as sieving classification, inertial classification, and centrifugal classification, and wet classification such as sedimentation classification.

3. Dust Core and Magnetic Element

Next, the dust core and the magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and an electric generator. In addition, the dust core according to the embodiment can be applied to the magnetic core included in the magnetic elements.

Hereinafter, two types of coil components will be representatively described as an example of the magnetic element.

3.1. Toroidal Type

First, a coil component of a toroidal type, which is an example of the magnetic element according to the embodiment, will be described.

FIG. 1 is a plan view schematically showing the coil component of the toroidal type.

A coil component 10 shown in FIG. 1 includes a ring-shaped dust core 11 and a conductive wire 12 wound around the dust core 11. Such a coil component 10 is generally referred to as a toroidal coil.

The dust core 11 is obtained by mixing the soft magnetic powder according to the embodiment and a binder, supplying the obtained mixture to a molding die, and pressing and molding the mixture. That is, the dust core 11 is a compact containing the soft magnetic powder according to the embodiment. In such a dust core 11, since the usage amount of the binder is small, the filling ratio (occupancy) of the soft magnetic powder can be increased. Therefore, the coil component 10 including the dust core 11 has high magnetic properties such as magnetic permeability and magnetic flux density. Therefore, when the coil component 10 is mounted on an electronic device or the like, it is possible to achieve high performance and miniaturization of the electronic device or the like.

Examples of a constituent material of the binder used in the manufacturing of the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate, and in particular, are preferably a thermosetting polyimide or an epoxy-based resin. The resin materials are easily cured by being heated and have excellent heat resistance. Therefore, manufacturability and the heat resistance of the dust core 11 can be improved.

A ratio of the binder to the soft magnetic powder slightly varies depending on the target magnetic properties and mechanical properties of the dust core 11 to be manufactured, the acceptable eddy current loss, and the like, and is preferably about 0.3 mass % or more and 5.0 mass % or less, more preferably about 0.5 mass % or more and 3.0 mass % or less, and still more preferably about 0.7 mass % or more and 2.0 mass % or less. Accordingly, it is possible to obtain the coil component 10 having the excellent magnetic properties while sufficiently binding the particles of the soft magnetic powder to each other.

Various additives may be added to the mixture for any purpose as necessary.

Examples of a constituent material of the conductive wire 12 include a material having high conductivity, for example, a metal material containing Cu, Al, Ag, Au, Ni, and the like. In addition, an insulating film is provided at the surface of the conductive wire 12 as necessary.

A shape of the dust core 11 is not limited to the ring shape shown in FIG. 1, and may be, for example, a shape in which the ring is partially lost, a shape in which the shape in the longitudinal direction is linear, a sheet shape, a film shape, or the like.

The dust core 11 may contain a soft magnetic powder or a non-magnetic powder other than the soft magnetic powder according to the above embodiment as necessary.

As described above, the coil component 10, which is a magnetic element, includes the dust core 11 containing the above soft magnetic powder. Accordingly, the coil component 10 having the excellent magnetic properties can be realized.

3.2. Closed Magnetic Circuit Type

Next, a coil component of a closed magnetic circuit type, which is an example of the magnetic element according to the embodiment, will be described.

Figure 2:
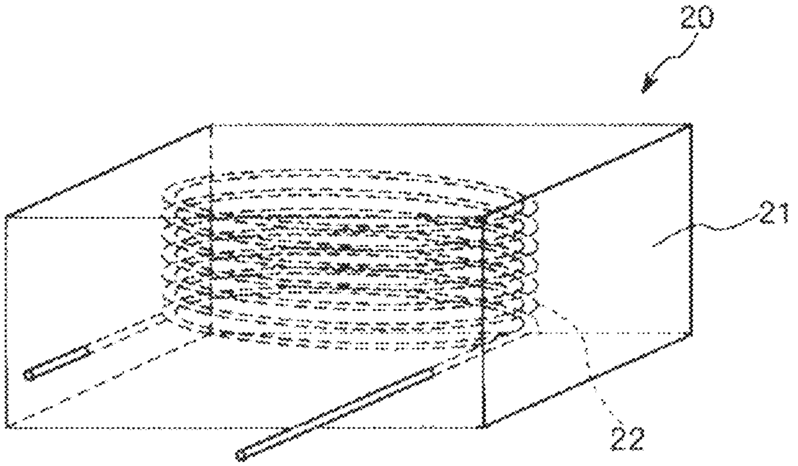
FIG. 2 is a transparent perspective view schematically showing a coil component of a closed magnetic circuit type.

FIG. 2 is a transparent perspective view schematically showing the coil component of the closed magnetic circuit type.

Hereinafter, the coil component of the closed magnetic circuit type will be described, and in the following description, differences from the coil component of the toroidal type will be mainly described, and descriptions of the same matters will be omitted.

As shown in FIG. 2, a coil component 20 according to the present embodiment is formed by embedding a conductive wire 22 formed in a coil shape in a dust core 21. That is, the coil component 20, which is a magnetic element, includes the dust core 21 containing the above soft magnetic powder, and is formed by molding the conductive wire 22 with the dust core 21. The dust core 21 has the same configuration as that of the above dust core 11. Accordingly, the coil component 20 having excellent magnetic properties can be realized.

The coil component 20 in such a form can be easily obtained in a relatively small size. In addition, since the coil component 20 has high magnetic properties, when the coil component 20 is mounted on an electronic device or the like, it is possible to achieve high performance and miniaturization of the electronic device or the like.

In addition, since the conductive wire 22 is embedded in the dust core 21, a gap is less likely to be formed between the conductive wire 22 and the dust core 21. Therefore, vibration due to magnetostriction of the dust core 21 can be prevented, and generation of noise due to the vibration can also be prevented.

A shape of the dust core 21 is not limited to the shape shown in FIG. 2, and may be a sheet shape, a film shape, or the like.

In addition, the dust core 21 may contain a soft magnetic powder or a non-magnetic powder other than the soft magnetic powder according to the above embodiment as necessary.

4. Electronic Device

Next, an electronic device including the magnetic element according to the embodiment will be described with reference to FIGS. 3 to 5.

Figure 3:
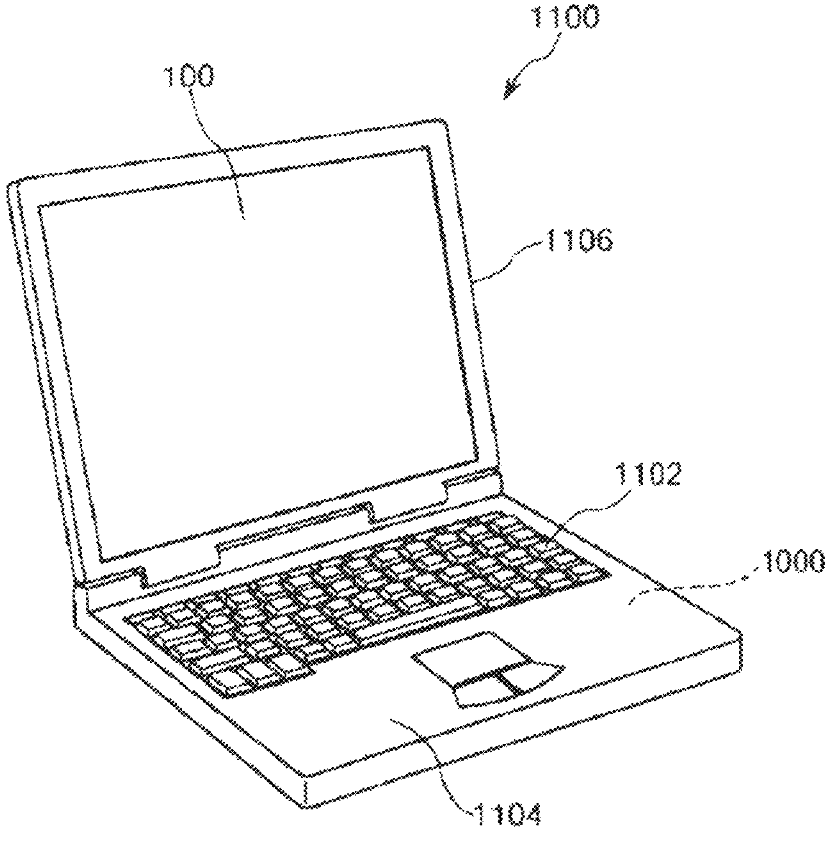
FIG. 3 is a perspective view showing a mobile personal computer which is an electronic device including a magnetic element according to an embodiment.

FIG. 3 is a perspective view showing a mobile personal computer which is an electronic device including the magnetic element according to the embodiment. A personal computer 1100 shown in FIG. 3 includes a main body 1104 including a keyboard 1102 and a display unit 1106 including a display 100. The display unit 1106 is rotatably supported by the main body 1104 via a hinge structure. Such a personal computer 1100 is incorporated with a magnetic element 1000 such as a choke coil or an inductor for a switching power supply, and a motor.

Figure 4:
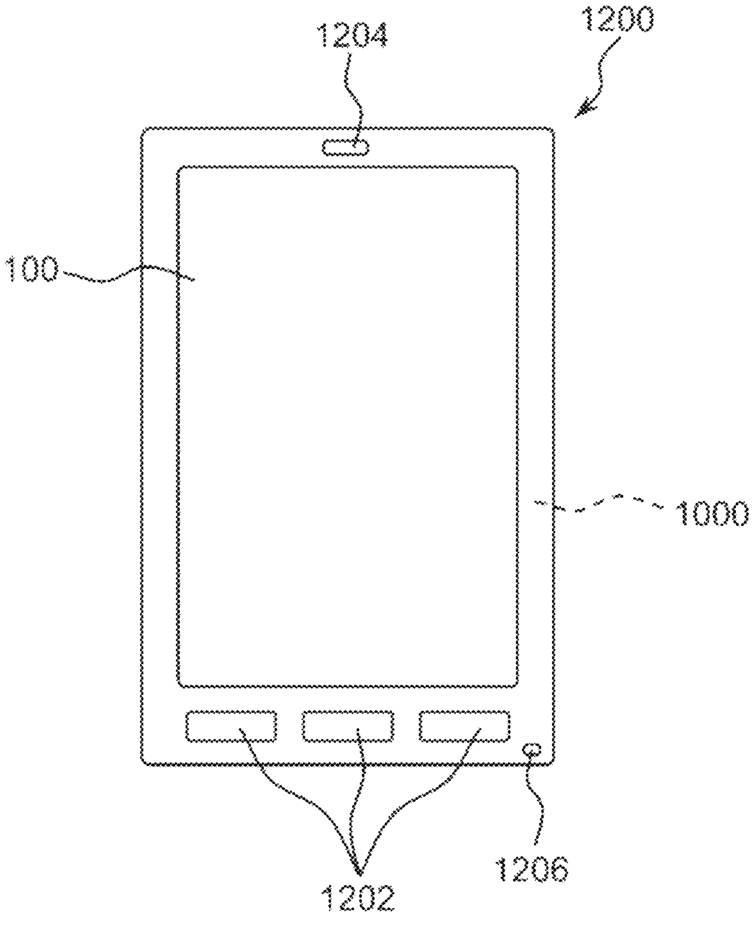
FIG. 4 is a plan view showing a smartphone which is an electronic device including the magnetic element according to the embodiment.

FIG. 4 is a plan view showing a smartphone which is an electronic device including the magnetic element according to the embodiment. A smartphone 1200 shown in FIG. 4 includes a plurality of operation buttons 1202, an earpiece 1204, and a mouthpiece 1206. In addition, the display 100 is disposed between the operation buttons 1202 and the earpiece 1204. Such a smartphone 1200 is incorporated with the magnetic element 1000 such as an inductor, a noise filter, and a motor.

Figure 5:
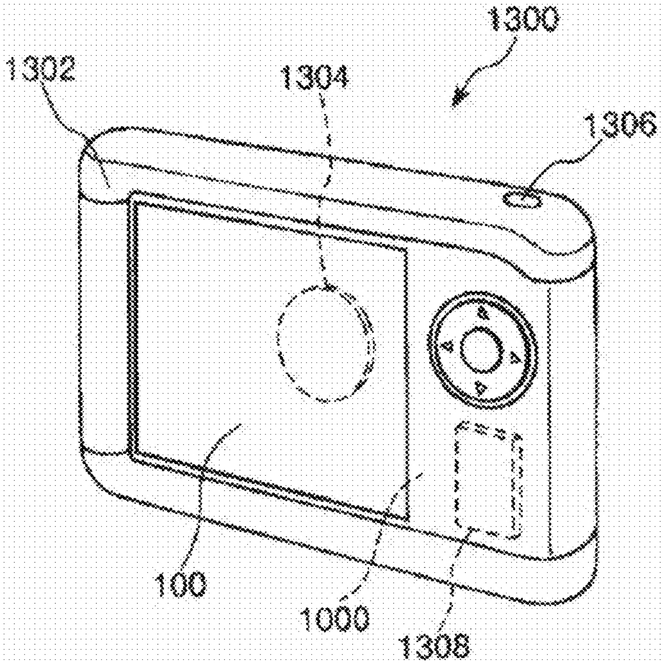
FIG. 5 is a perspective view showing a digital still camera which is an electronic device including the magnetic element according to the embodiment.

FIG. 5 is a perspective view showing a digital still camera which is an electronic device including the magnetic element according to the embodiment. A digital still camera 1300 photoelectrically converts an optical image of a subject by an imaging element such as a charge coupled device (CCD) to generate an imaging signal.

The digital still camera 1300 shown in FIG. 5 includes the display 100 provided at a rear surface of a case 1302. The display 100 functions as a finder that displays the subject as an electronic image. In addition, a light receiving unit 1304 including an optical lens, the CCD, and the like is provided at a front surface of the case 1302, that is, at a rear surface in the drawing.

When a photographer confirms a subject image displayed on the display 100 and presses a shutter button 1306, the imaging signal of the CCD at that time is transferred and stored in a memory 1308. Such a digital still camera 1300 is also incorporated with the magnetic element 1000 such as an inductor or a noise filter.

Examples of the electronic device according to the embodiment include, in addition to the personal computer of FIG. 3, the smartphone of FIG. 4, and the digital still camera of FIG. 5, for example, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measuring device, an ultrasonic diagnostic device, and an electronic endoscope, a fish finder, various measuring devices, instruments for a vehicle, an aircraft, and a ship, vehicle control devices such as an automobile control device, an aircraft control device, a railway vehicle control device, and a ship control device, and a flight simulator.

As described above, such an electronic device includes the magnetic element according to the embodiment. Accordingly, it is possible to exert the effect of the magnetic element having excellent magnetic properties and achieve high performance of the electronic device.

5. Vehicle

Next, a vehicle including the magnetic element according to the present embodiment will be described with reference to FIG. 6.

Figure 6:
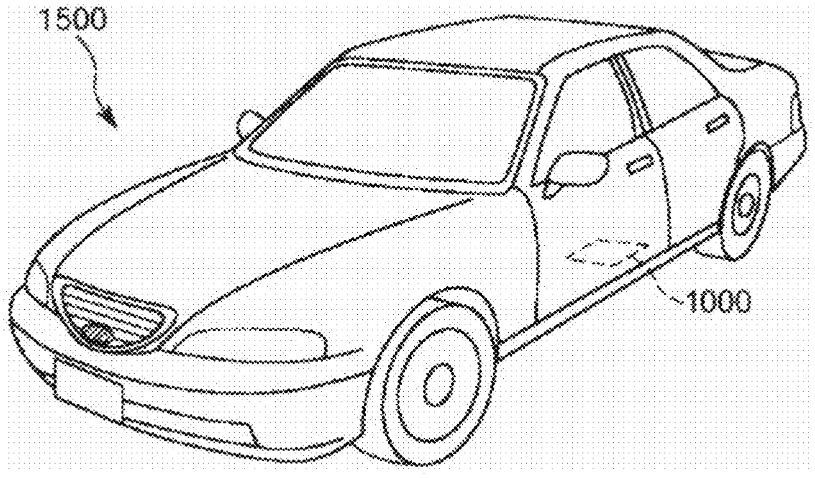
FIG. 6 is a perspective view showing an automobile which is a vehicle including the magnetic element according to the embodiment.

FIG. 6 is a perspective view showing an automobile which is the vehicle including the magnetic element according to the embodiment.

An automobile 1500 is incorporated with the magnetic element 1000. Specifically, the magnetic element 1000 is incorporated in various automobile parts such as a car navigation system, an anti-lock brake system (ABS), an engine control unit, a battery control unit of a hybrid vehicle or an electric vehicle, a vehicle body posture control system, an electronic control unit (ECU) such as an automatic driving system, a driving motor, a generator, and an air conditioning unit.

As described above, such a vehicle includes the magnetic element according to the embodiment. Accordingly, it is possible to exert the effect of the magnetic element having excellent magnetic properties and achieve high performance of the vehicle.

The vehicle according to the present embodiment may be, in addition to the automobile shown in FIG. 6, for example, a two-wheeled vehicle, a bicycle, an aircraft, a helicopter, a drone, a ship, a submarine, a railway, a rocket, and a spacecraft.

The soft magnetic powder, the dust core, the magnetic element, the electronic device, and the vehicle according to the present disclosure have been described above based on the preferred embodiment, and the present disclosure is not limited thereto.

For example, in the above embodiment, a compact such as a dust core has been described as an application example of the soft magnetic powder according to the present disclosure, but the application example is not limited thereto. The application example of the soft magnetic powder may be a magnetic device such as a magnetic fluid, a magnetic head, and a magnetic shielding sheet.

In addition, the shapes of the dust core and the magnetic element are not limited to those shown in the drawings, and may be any shapes.

EXAMPLES

Next, a specific example of the present disclosure will be described.

6. Manufacturing of Soft Magnetic Powder 6.1. Sample No. 1

First, a metal powder was obtained by a water atomization method. Next, the obtained metal powder was classified using a sieve.

Next, the classified metal powder was subjected to a heat treatment to obtain soft magnetic metal particles. Then, the obtained soft magnetic metal particles were used as a soft magnetic powder of Sample No. 1.

Constituent materials (soft magnetic materials) of the obtained soft magnetic powder are shown in Table 1. A composition formula shown in Table 1 represents a ratio of the constituent elements of the soft magnetic material in terms of atomic %.

6.2. Sample Nos. 2 to 27

Soft magnetic powders were obtained in the same manner as Sample No. 1 except for the composition of the soft magnetic powder as shown in Table 1, Table 2, or Table 3. The average particle diameter d and the specific surface area S shown in Tables 2 and 3 were adjusted by changing the manufacturing conditions of the powder by the atomization method. The manufacturing conditions used for the adjustment were mainly a flow-down amount of the molten metal per unit time, the flow velocity of the cooling medium, and the temperature of the molten metal.

TABLE 1

| Soft magnetic powder | Composition formula | Manufacturing method |
|---|---|---|
| Crystalline material | $Fe_{92}Si_{3.5}Cr_{4.5}$ | Water atomization method |
| Amorphous material 1 | $(Fe_{0.97}Cr_{0.03})_{76}(Si_{0.5}B_{0.5})_{22}C_2$ | Water atomization method |
| Amorphous material 2 | $(Fe_{0.97}Cr_{0.03})_{76}(Si_{0.5}B_{0.5})_{22}C_2$ | Rotary water atomization method |
| Microcrystalline material 1 | $Fe_{73.5}Cu_1Nb_3Si_{13.5}B_9$ | Water atomization method |
| Microcrystalline material 2 | $Fe_{73.5}Cu_1Nb_3Si_{13.5}B_9$ | Rotary water atomization method |

7. Evaluation on Soft Magnetic Powder 7.1. Particle Size Distribution

The particle size distribution of the soft magnetic powder of each sample No. was measured. The measurement was performed by a laser diffraction particle size distribution measuring device, Microtrac, HRA9320-X100 manufactured by Nikkiso Co., Ltd. Then, particle diameters D10, D50, and D90 of the soft magnetic powders were calculated from the particle size distribution. Calculation results are shown in Table 2 or Table 3. The particle diameter D50 was defined as the average particle diameter d.

7.2. True Specific Gravity

The true specific gravity ρ of the soft magnetic powder of each sample No. was measured by a full-automatic gas displacement type densitometer AccuPyc 1330 manufactured by Micromeritics Instrument Corporation. Measurement results are shown in Table 2 or 3.

7.3. Specific Surface Area

The specific surface area S of the soft magnetic powder of each sample No. was measured. The measurement was performed using a BET specific surface area measuring device HM1201-010 manufactured by Mountech Co., Ltd. Measurement results are shown in Table 2 or 3.

7.4. True Sphere Equivalent Specific Surface Area

The true sphere equivalent specific surface area $6/(d \cdot \rho)$ of the soft magnetic powder of each sample No. was calculated. The true sphere equivalent specific surface area $6/(d \cdot \rho)$ was calculated from the average particle diameter d and the true specific gravity ρ of the soft magnetic material. Calculation results are shown in Table 2 or Table 3.

7.5. Coefficient k as Multiple of Specific Surface Area S to True Sphere Equivalent Specific Surface Area $6/(d \cdot \rho)$ The coefficient k of the soft magnetic powder of each sample No. was calculated. The coefficient k is a multiple of the measured specific surface area S with respect to the true sphere equivalent specific surface area $6/(d \cdot \rho)$. Calculation results are shown in Table 2 or Table 3.

7.6. Oxygen Content

The oxygen content in the mass ratio of the soft magnetic powder of each sample No. was measured. An oxygen and nitrogen analyzer TC-300/EF-300 manufactured by LECO Corporation was used. Measurement results are shown in Table 2 or 3.

8. Manufacturing of Compact

The soft magnetic powder of each sample No. was used to manufacture a compact as follows.

First, the soft magnetic powder, an epoxy resin (a binder), and methyl ethyl ketone (an organic solvent) were mixed to obtain a mixed material. An addition amount of the epoxy resin is as shown in Table 2 or Table 3.

Next, the obtained mixed material was stirred and then dried by heating at a temperature of 150° C. for 30 minutes to obtain a massive dried body. Next, the dried body was sieved with a sieve having an opening of 500 μm, and the dried body was pulverized to obtain a granulated powder.

Next, the obtained granulated powder was filled in a molding die, and a molded body was obtained based on the following molding conditions.

Molding method: press molding

Shape of molded body: ring shape

Dimensions of molded body: outer diameter ϕ: 14 mm, inner diameter ϕ: 7 mm, thickness: 3 mm Molding pressure: 294 MPa Next, the binder in the molded body was heated to be cured. Accordingly, a compact was obtained.

9. Evaluation on Mixed Material

A viscosity of the mixed material containing the soft magnetic powder of each sample No. was measured. For the measurement of the mixed material, the viscosity at 20° C. was measured using a dynamic viscoelasticity measuring device (a rheometer). Then, the measured viscosity was evaluated against the following evaluation criteria.

A: the viscosity is particularly low

B: the viscosity is slightly low

C: the viscosity is medium

D: the viscosity is slightly high

E: the viscosity is particularly high

Evaluation results are shown in Table 2 or 3.

10. Evaluation on Soft Magnetic Powder 10.1. Strength of Compact

With respect to the soft magnetic powder of each sample No., a compact was obtained by the method shown in 8.

Next, the strength of the obtained compact was measured. For the measurement of the strength, the maximum load until the compact was broken was measured using a compression testing machine. Then, the strength of the compact was evaluated by comparing the measured maximum load with the following evaluation criteria.

A: the strength of the compact is particularly high

B: the strength of the compact is slightly high

C: the strength of the compact is medium

D: the strength of the compact is slightly low

E: the strength of the compact is particularly low

Evaluation results are shown in Table 2 or 3.

10.2. Density of Compact

With respect to the soft magnetic powder of each sample No., a compact was obtained by the method shown in 8.

Next, a mass of the obtained compact was measured, and a density of the compact was calculated based on the measured mass. Then, the calculated density was evaluated against the following evaluation criteria.

A: the density of the compact is particularly high

B: the density of the compact is slightly high

C: the density of the compact is medium

D: the density of the compact is slightly low

E: the density of the compact is particularly low

Evaluation results are shown in Table 2 or 3.

10.3. Coercive Force

The coercive force of the soft magnetic powder of each sample No. was measured using a VSM system TM-VSM1230-MHHL manufactured by Tamakawa Co., Ltd., as a magnetization measuring device. Measurement results are shown in Table 3.

10.4. Saturation Magnetic Flux Density

A saturation magnetic flux density of the soft magnetic powder of each sample No. was calculated by the following method. First, the maximum magnetization Mm of the soft magnetic powder was measured using a magnetization measuring device.

Next, a saturation magnetic flux density Bs was obtained by the following formula.

$$Bs=4\pi/10000\times\rho\times Mm$$

Calculation results are shown in Table 3.

TABLE 2

| Sample No. | | Properties of soft magnetic powder | | | | | |
|---|---|---|---|---|---|---|---|
| | | Soft magnetic material | Average particle diameter D50 d μm | True specific gravity ρ g/cm³ | Specific surface area S m²/g | True sphere equivalent specific surface area 6/(d · ρ) m²/g | Multiple k as to true sphere equivalent specific surface area — |
| No. 1 | Comparative Example | Crystalline Material | 2.5 | 7.16 | 1.44 | 0.34 | 4.30 |
| No. 2 | Comparative Example | Crystalline Material | 2.5 | 7.16 | 1.44 | 0.34 | 4.30 |
| No. 3 | Comparative Example | Crystalline Material | 2.5 | 7.16 | 1.44 | 0.34 | 4.30 |
| No. 4 | Example | Crystalline Material | 2.5 | 7.16 | 1.10 | 0.34 | 3.28 |
| No. 5 | Example | Crystalline Material | 2.5 | 7.16 | 1.10 | 0.34 | 3.28 |
| No. 6 | Example | Crystalline Material | 2.5 | 7.16 | 1.10 | 0.34 | 3.28 |
| No. 7 | Example | Crystalline Material | 3.0 | 7.16 | 0.70 | 0.28 | 2.51 |
| No. 8 | Example | Crystalline Material | 3.0 | 7.16 | 0.70 | 0.28 | 2.51 |
| No. 9 | Example | Crystalline Material | 3.0 | 7.16 | 0.70 | 0.28 | 2.51 |
| No. 10 | Example | Crystalline Material | 3.0 | 7.16 | 0.60 | 0.28 | 2.15 |
| No. 11 | Example | Crystalline Material | 3.0 | 7.16 | 0.55 | 0.28 | 1.97 |
| No. 12 | Example | Crystalline Material | 3.0 | 7.16 | 0.55 | 0.28 | 1.97 |
| No. 13 | Example | Crystalline Material | 8.0 | 7.16 | 0.20 | 0.10 | 1.91 |

TABLE 2-continued

| | | | | | | | |
|---|---|---|---|---|---|---|---|
| No. 14 | Example | Crystalline Material | 8.0 | 7.16 | 0.15 | 0.10 | 1.43 |
| No. 15 | Example | Crystalline Material | 8.0 | 7.16 | 0.16 | 0.10 | 1.53 |
| No. 16 | Example | Crystalline Material | 8.0 | 7.16 | 0.16 | 0.10 | 1.53 |

| Sample No. | | Properties of soft magnetic powder Oxygen content ppm | Evaluation results of mixed material Addition amount of binder mass % | Evaluation results of mixed material Viscosity — | Evaluation results of soft magnetic powder Strength of compact — | Evaluation results of soft magnetic powder Density of compact — |
|---|---|---|---|---|---|---|
| No. 1 | Comparative Example | 6600 | 1.0 | E | E | D |
| No. 2 | Comparative Example | 6600 | 1.5 | E | D | E |
| No. 3 | Comparative Example | 6600 | 2.0 | D | C | E |
| No. 4 | Example | 6500 | 2.0 | D | B | D |
| No. 5 | Example | 5500 | 1.0 | D | C | C |
| No. 6 | Example | 5500 | 2.0 | D | B | D |
| No. 7 | Example | 6000 | 1.0 | D | D | B |
| No. 8 | Example | 6000 | 1.5 | C | C | C |
| No. 9 | Example | 6000 | 2.0 | C | B | C |
| No. 10 | Example | 4500 | 2.0 | C | A | C |
| No. 11 | Example | 4000 | 1.0 | C | C | B |
| No. 12 | Example | 4000 | 2.0 | B | A | C |
| No. 13 | Example | 2000 | 2.0 | B | A | B |
| No. 14 | Example | 1500 | 2.0 | A | A | B |
| No. 15 | Example | 1600 | 1.0 | B | B | A |
| No. 16 | Example | 1600 | 2.0 | A | A | B |

TABLE 3

| Sample No. | | Properties of soft magnetic powder: Soft magnetic material | Particle size distribution D10 μm | Particle size distribution D50 d μm | Particle size distribution D90 μm | True specific gravity ρ $g/cm^3$ | Specific surface area S $m^2/g$ | True sphere equivalent specific surface area 6/(d · ρ) $m^2/g$ | Multiple k as to true sphere equivalent specific surface area — |
|---|---|---|---|---|---|---|---|---|---|
| No. 17 | Comparative Example | Crystalline material | 1.2 | 2.4 | 3.8 | 7.16 | 1.47 | 0.35 | 4.21 |
| No. 18 | Comparative Example | Crystalline material | 1.2 | 2.4 | 3.7 | 7.16 | 1.45 | 0.35 | 4.15 |
| No. 19 | Example | Crystalline material | 1.1 | 2.4 | 3.9 | 7.62 | 1.14 | 0.33 | 3.47 |
| No. 20 | Comparative Example | Amorphous material 1 | 1.8 | 3.3 | 5.2 | 7.08 | 1.12 | 0.26 | 4.36 |
| No. 21 | Example | Amorphous material 1 | 1.8 | 3.3 | 5.2 | 7.08 | 0.53 | 0.26 | 2.06 |
| No. 22 | Example | Amorphous material 1 | 1.8 | 3.3 | 5.2 | 7.08 | 0.53 | 0.26 | 2.06 |
| No. 23 | Example | Amorphous material 2 | 3.0 | 8.0 | 11.5 | 7.08 | 0.21 | 0.11 | 1.98 |
| No. 24 | Comparative Example | Micro-crystalline material 1 | 1.8 | 3.3 | 5.4 | 7.25 | 1.05 | 0.25 | 4.19 |
| No. 25 | Example | Micro-crystalline Material 1 | 1.8 | 3.3 | 5.4 | 7.25 | 0.45 | 0.25 | 1.79 |
| No. 26 | Example | Micro-crystalline material 1 | 1.8 | 3.3 | 5.4 | 7.25 | 0.45 | 0.25 | 1.79 |
| No. 27 | Example | Micro-crystalline material 2 | 2.4 | 6.5 | 9.6 | 7.25 | 0.26 | 0.13 | 2.04 |

TABLE 3-continued

| | | Properties of soft magnetic powder | Evaluation results of mixed material | | Evaluation results of soft magnetic powder | | | |
|---|---|---|---|---|---|---|---|---|
| Sample No. | | Oxygen content ppm | Addition amount of binder mass % | Viscosity — | Strength of compact — | Density of compact — | Coercive force Oe | Saturation magnetic flux density T |
| No. 17 | Comparative Example | 6621 | 1.0 | C | C | C | 26.0 | 1.43 |
| No. 18 | Comparative Example | 15838 | 1.0 | C | C | C | 25.0 | 1.45 |
| No. 19 | Example | 6500 | 1.0 | B | B | B | 18.8 | 1.73 |
| No. 20 | Comparative Example | 8500 | 1.0 | C | C | C | 3.20 | 1.05 |
| No. 21 | Example | 4000 | 1.0 | B | A | A | 1.91 | 1.24 |
| No. 22 | Example | 4000 | 2.0 | A | A | B | 1.91 | 1.20 |
| No. 23 | Example | 2000 | 1.0 | B | A | A | 1.90 | 1.25 |
| No. 24 | Comparative Example | 9400 | 1.0 | C | C | C | 2.61 | 0.98 |
| No. 25 | Example | 5500 | 1.0 | B | A | A | 1.20 | 1.16 |
| No. 26 | Example | 5500 | 2.0 | B | A | B | 1.20 | 1.12 |
| No. 27 | Example | 2500 | 1.0 | B | A | A | 1.19 | 1.17 |

In Tables 2 and 3, among the soft magnetic powders of the sample Nos., those corresponding to the present disclosure are described as "Examples", and those not corresponding to the present disclosure are described as "Comparative Examples".

As shown in Tables 2 and 3, when the coefficient k as a multiple of the specific surface area S measured for the soft magnetic powder (soft magnetic metal particles) with respect to the true sphere equivalent specific surface area $6/(d\cdot\rho)$ was calculated, in a case where the coefficient k was within a predetermined range, it was possible to obtain an appropriate viscosity in the mixed material even when the addition amount of the binder was reduced. Further, it was recognized that such a mixed material can obtain a compact having high strength and density even when the addition amount of the binder was reduced. In addition, it was also recognized that the saturation magnetic flux density was increased in a compact having a high density. Accordingly, it was found that, according to the present disclosure, when a compact is manufactured using a binder, the amount of the binder to be used can be reduced, and a compact having excellent magnetic properties can be manufactured.

Further, Table 3 also shows that a soft magnetic powder having a low coercive force can be obtained by using an amorphous material or a microcrystalline material.

10.5. Microscope Observation

Figure 7:
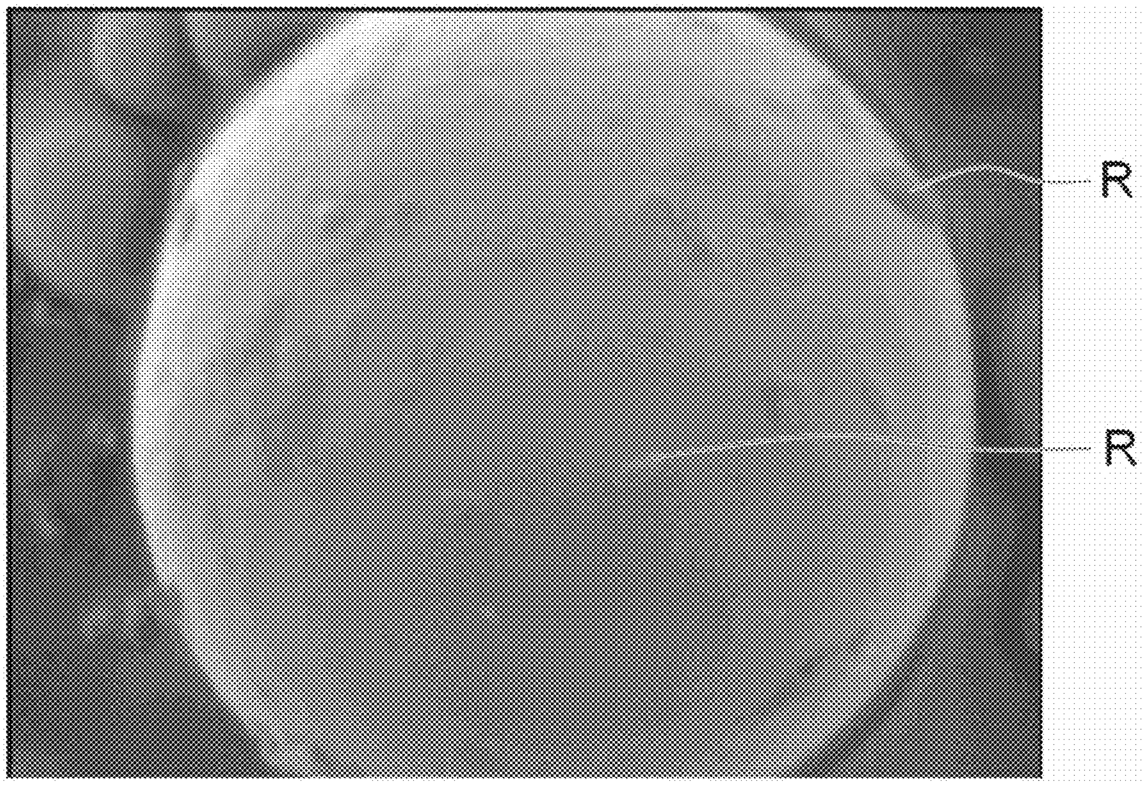
FIG. 7 is an observation image of a soft magnetic powder of Sample No. 17.
Figure 8:
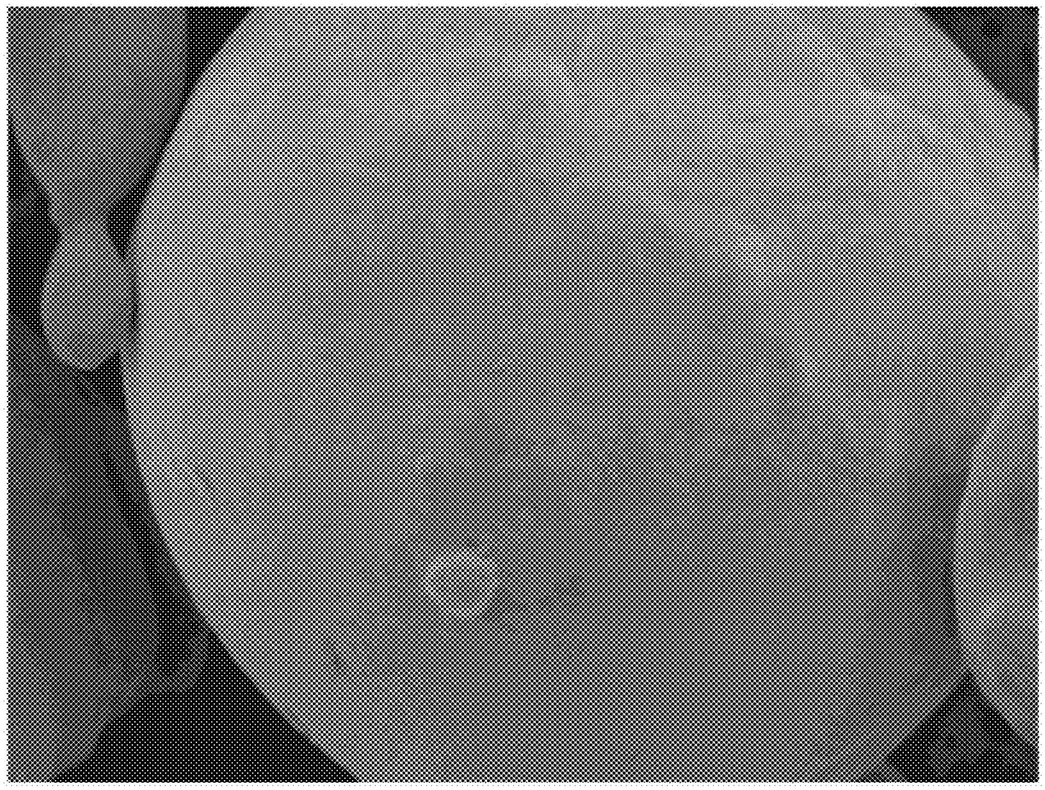
FIG. 8 is an observation image of a soft magnetic powder of Sample No. 19.
Figure 9:
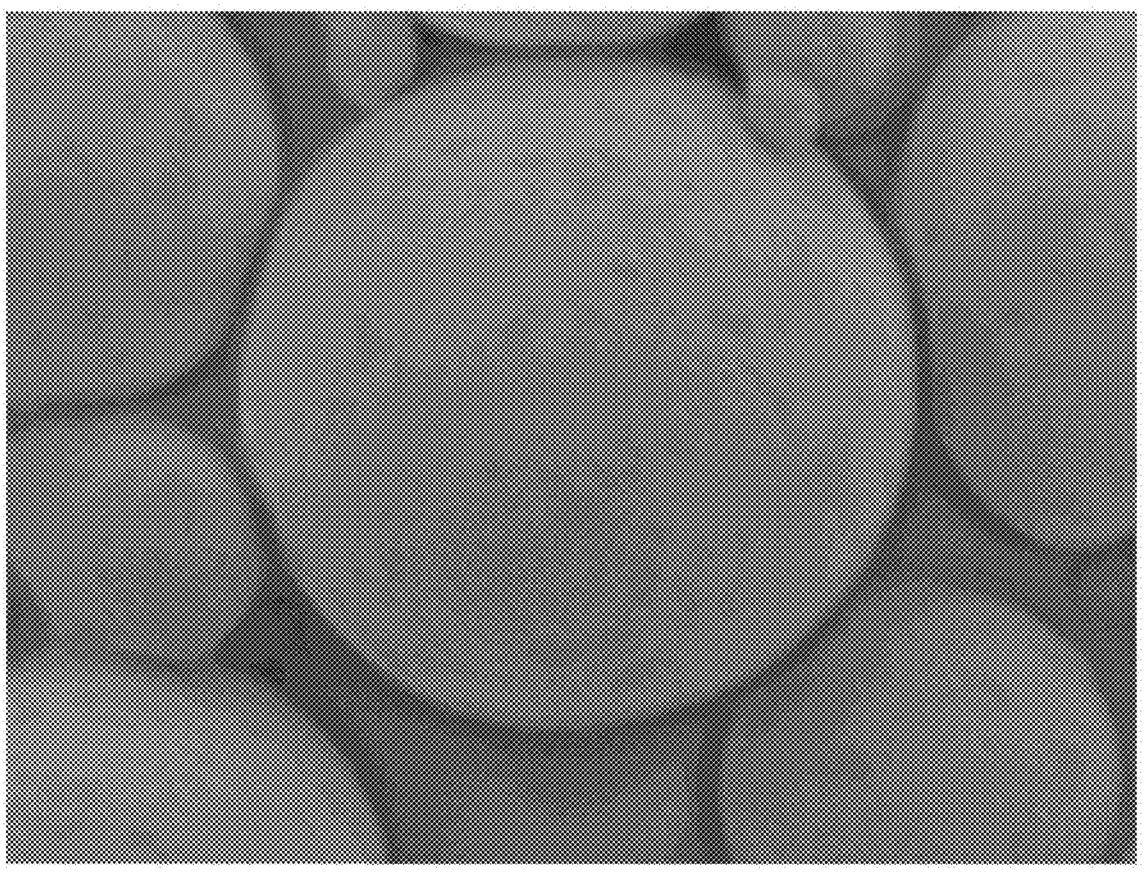
FIG. 9 is an observation image of a soft magnetic powder of Sample No. 21.

The soft magnetic powders of Sample Nos. 17, 19, and 21 were observed by a scanning electron microscope. Observation images were shown in FIGS. 7 to 9. FIG. 7 is an observation image of the soft magnetic powder of Sample No. 17. FIG. 8 is an observation image of the soft magnetic powder of Sample No. 19. FIG. 9 is an observation image of the soft magnetic powder of Sample No. 21.

In FIG. 7, regions R in which foreign matters adhere to places on the surface of the particles are observed. Each of the regions R is considered to be a region where an oxide is precipitated. Therefore, it is considered that in the soft magnetic powder of Sample No. 17, the specific surface area S is increased due to the precipitation of the oxide on the surface of the particles.

In FIGS. 8 and 9, almost no dark color region as seen in FIG. 7 was confirmed.

What is claimed is:

1. A soft magnetic powder comprising soft magnetic metal particles satisfying following formulas (A), (B), and (C), $$S=k\{6/(d\cdot\rho)\} \tag{A}$$

$$1.0\leq k\leq 4.0 \tag{B}$$

$$1.0\leq d\leq 10.0 \tag{C}$$

wherein S [m$^2$/g] indicates a specific surface area, d [μm] indicates an average particle diameter, and ρ [g/cm$^3$] indicates a true specific gravity, and wherein the true specific gravity ρ is 7.08 g/cm$^3$ or more and 7.62 g/cm$^3$ or less.

2. The soft magnetic powder according to claim 1, wherein the soft magnetic metal particles contain, as a main material, a microcrystalline material made of a crystal structure having a particle diameter of 1.0 nm or more and 30.0 nm or less.

3. The soft magnetic powder according to claim 1, wherein the soft magnetic metal particles contain, as a main material, an amorphous material made of an amorphous structure.

4. The soft magnetic powder according to claim 1, wherein the soft magnetic metal particles have an oxygen content of 10000 ppm or less in terms of mass ratio.

5. The soft magnetic powder according to claim 1 comprising:

the soft magnetic metal particles; and an insulating film provided at a surface of the soft magnetic metal particles.

6. A dust core comprising the soft magnetic powder according to claim 1.

7. A magnetic element comprising the dust core according to claim 6.

8. An electronic device comprising the magnetic element according to claim 7.

9. A vehicle comprising the magnetic element according to claim 7.

* * * * *